April 12, 1949.   M. W. GETLER   2,466,698
OPTICAL BORE-STRAIGHTNESS INDICATOR
Filed July 13, 1944
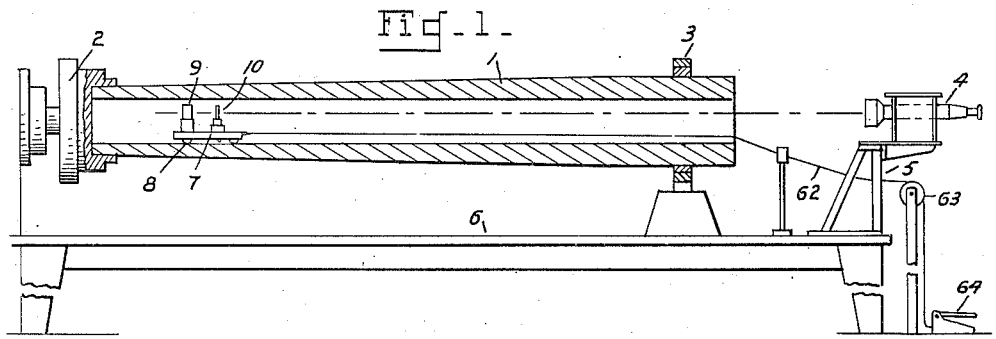
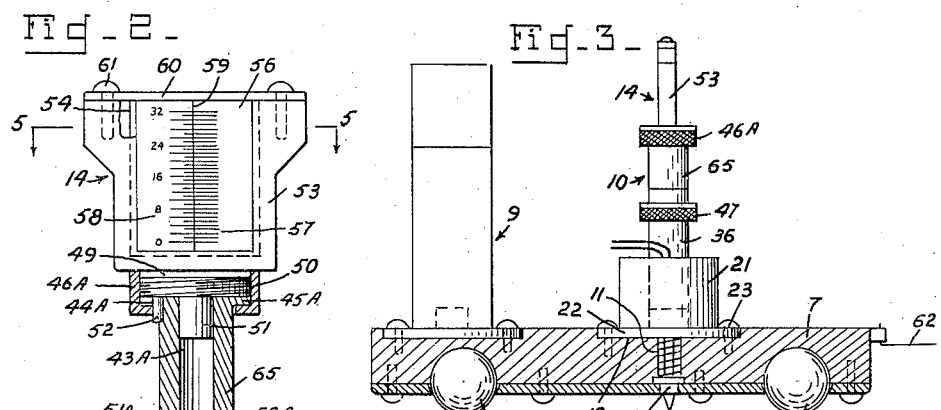
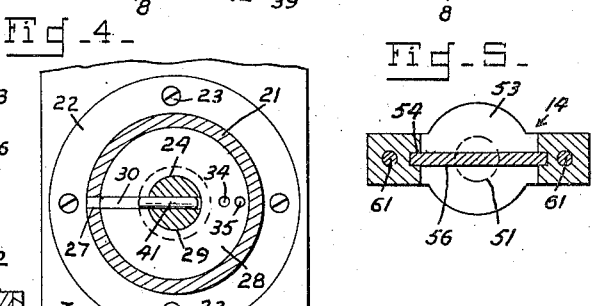
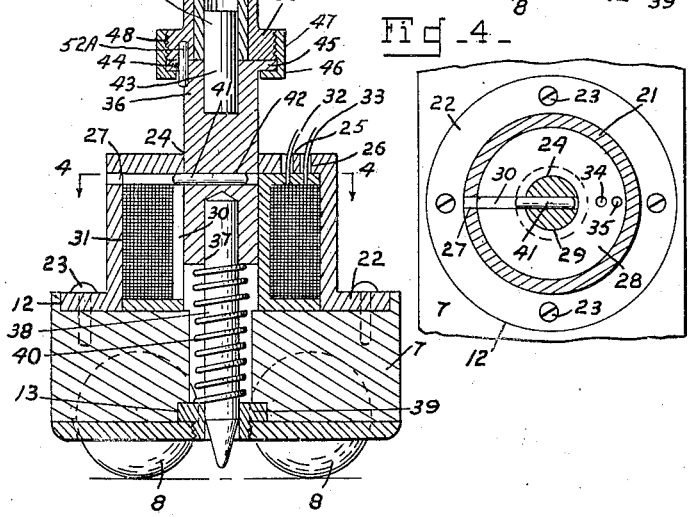
Inventor
Maurice W. Getler
By C. E. Herrstrom & H. E. Thibodeau
Attorneys Patented Apr. 12, 1949

2,466,698

UNITED STATES PATENT OFFICE 2,466,698

OPTICAL BORE-STRAIGHTNESS INDICATOR

Maurice W. Getler, Troy, N. Y., assignor to the United States of America as represented by the Secretary of War Application July 13, 1944, Serial No. 544,803

9 Claims. (Cl. 33—46)

(Granted under the act of March 3, 1883, as amended April 30, 1928; 370 O. G. 757)

The invention described herein may be manufactured and used by or for the Government for governmental purposes without the payment to me of any royalty thereon.

Present methods of determining straightness of large diameter bores of great length, as for example the bore of a gun tube, which methods are commonly referred to as "telltaling," require a lathe bed of at least twice the length of the tube, or an auxiliary track to extend beyond the tail of the lathe for a proportional distance. This requirement for extra floor space constitutes a demand that is often difficult and always expensive to meet. A second consideration is the time heretofore required for telltaling a gun tube, both the machine and the operator being non-productive during this period.

Accordingly, it is object of this invention to provide an improved telltaling device which will require a minimum of floor space and be rapid and accurate in operation, with resultant saving in both machine and man hours.

The specific nature of the invention as well as other objects and advantages thereof will clearly appear from a description of a preferred embodiment as shown in the accompanying drawings in which:

Fig. 1 shows a schematic layout of the telltaling apparatus in relation to a tubular member being tested;

Fig. 2 shows an elevational section thru the carriage;

Fig. 3 shows a combination longitudinal view and section of the carriage;

Fig. 4 shows a section 4—4 thru the solenoid housing; and

Fig. 5 shows a section 5—5 thru the movable scale and housing.

In Fig. 1, a schematic layout of the invention is shown. A gun tube 1 is held in a chuck 2 and a rotating steady rest 3 of a conventional lathe. A telescope 4 and mount 5 are located on the tail end of a lathe bed 6 with the optical axis of telescope 4 parallel to, somewhat above, and in the same vertical plane as the axis of rotation of the lathe. Any convenient rigid method of mounting the telescope 4 may be used, said mount 5 being no part of this invention. A movable carriage or base 7, rolling on four hardened steel balls 8, carrying on the rear portion thereof a shielded light 9 and on the forward portion a movable scale assembly 10, is placed within the gun tube 1, the scale assembly 10 adjusted vertically to be in alignment with the optical axis of the telescope 4.

The forward portion of the movable base 7 has a vertical hole 11 (Fig. 3), and counterbores 12 and 13 for mounting the sliding scale assembly 10. The assembly 10 conists of a solenoid housing 21 which is located in the counterbore 12, with the top of flange 22 just flush with the upper face of the movable base 7. Four screws 23 hold the housing 21 in place. In the top of the housing 21 (Fig. 2), are three holes 24, 25, and 26. Hole 24 is axially coincident with the housing body and in assembled position is aligned with the hole 11 in the movable base 7. Two other holes 25 and 26 are in spaced radial relationship at one side of the center hole 24. In the side of the housing 21, there is provided a radial hole 27, diametrically opposite holes 25 and 26, all three being centered in a vertical plane through the axis of housing 21 (Fig. 4).

Within the solenoid housing 21, is a spool 28 provided with an axial cylindrical hole 29 and a slot 30 extending entirely through one side. This spool 28 carries a solenoid winding 31, lead wires 32 and 33 coming out through holes 34 and 35 in the end of spool 28 and the holes 25 and 26 in the housing, the two pairs of holes being in alignment in assembly.

A cylindrical plunger 36 is provided having an axial opening 37 in the bottom, in which a stud 38 is assembled by a press fit. This stud 38 is proportioned to produce a free sliding fit in a bushing 39 inserted in the counterbore 13 and is surrounded by a spring 40 which rests on the bushing 39 and in turn supports the sliding plunger 36.

In assembly a pin 41 is inserted through the radial hole 27 in the housing 21, into the slot 30 in the spool 28. The screws 23 (4) are then tightened to secure the housing 21 and spool 28 in permanent alignment. After moving the plunger 36 to bring a diametrical hole 42 in alignment with the radial hole 27 and slot 30, the pin 41 is forced inward through slot 30 into hole 42, leaving the end of pin 41 projecting into the vertical part of slot 30 in the spool 28. Thus the plunger 36 is held in fixed angular alignment with the longitudinal axis of movable base 7, and at the same time the vertical motion of plunger 36 is limited to the length of the vertical slot 30 in spool 28, the inner surface of housing 21 acting as a stop when contacted by the protruding portion of the pin 41.

The upper end of plunger 36 is provided with an axial hole 43 and a small dowel hole 44 in radial alignment with the diametrical hole 42. A flange 45 is provided on the end of plunger 36 and this flange engages a screw collar 46 through which plunger 36 is insertable. The screw collar 46 has a knurled periphery 47 and an internal thread 48.

Mounted on top of the plunger 36 is a scale-holding unit 14 (Fig. 5), comprising a cylindrical base 49 having a threaded flange 50 engageable with the thread in the screw collar 46A. The base 49 has an axially depending stud 51 and dowel pin 52 arranged to mate respectively with the bore 43A of a sleeve-like spacer 65 and a longitudinal dowel hole 44A therein. On the bottom of spacer 65 a threaded flange 50A is assembled thereto by a press fit and is threadably engaged by screw collar 46. A depending stud 51A is pressed into the bore 43A and a dowel pin 52A is pressed into the flange 50A in identical relative location with respect to the axis of spacer 65 as the dowel 52. Stud 51A and dowel pin 52A mate with the holes 43 and 44 respectively in the top of the plunger 36. A yoke 53 is integrally formed on top of cylindrical base 49. A slot 54 is provided around the interior of yoke 53. An indicating scale 56 of translucent material is assembled in the slot 54 and carries on the front face thereof horizontal graduations 57 at $\frac{1}{32}$ inch intervals and corresponding numerals 58. The back face of scale 56 carries a vertical centerline 59 which in assembly lies in the plane passing through the axis of sliding plunger 36 and the longitudinal axis of the movable base 7, the face of the scale 56 being perpendicular to the aforementioned plane. A cover plate 60 is fastened on the top of yoke 53 by screws 61 and thereby holds the scale 56 in place.

The shielded light 9 may be of any convenient type, provided only that it adequately illuminates the scale and is sufficiently shielded to prevent glare. The light 9 and the solenoid lead wires 32 and 33 are attached to an electric cable 62 which runs over a reel 63 and is connected through a foot switch 64 of any convenient type, to the power line.

In operation, the bore to be telltaled, for example, the gun tube 1 is placed in the lathe, being held by chuck 2 and rotating steady rest 3 which is adjusted to bring the axis of the gun tube forging 1 into approximate alignment with the axis of rotation of the lathe. The carriage assembly is then placed in one end of the bore of the gun tube 1 and the scale 56 adjusted to such a height that the horizontal cross hair in the telescope 4 superimposes across its lower portion. The foot switch 64 is then closed, activating the solenoid and causing the stud 38 to move downward to contact the lower surface of the bore, and at the same time lighting the lamp 9, whereupon a reading is taken and recorded. This position in the gun tube is designated as station A and the carriage assembly is then drawn through the gun tube 1 by means including cable 62 and readings are taken at fixed intervals. When this side, i. e., station A is done, the gun tube is rotated 90° to station B and readings are taken at corresponding positions. This procedure is repeated for station C (180° from station A) and station D (270° from station A). By checking readings for corresponding positions in opposite station, the deviation of the bore from the axis of rotation is determined and the gun tube can be "thrown" on the lathe to compensate for such deviation. If the error is too great, the gun tube is removed and straightened and then replaced in the lathe and telltaled again.

When the telltaling device is to be used in a tube of smaller bore diameter than can be accommodated by the device as above described, the spacer 65 may be removed from its position between plunger 36 and scale holding unit 14 and scale holding unit 14 assembled directly to plunger 36 by screw collar 46.

In addition to the saving in floor space, savings as high as 50% have been realized in the time required for telltaling a large diameter bore by utilization of devices embodying this invention.

I claim:

1. Apparatus for "telltaling" large horizontal bores comprising a carriage constructed to be insertable in the bore, means for moving said carriage through the bore along the bottom thereof, a vertical indicating scale mounted on said carriage for vertical movement with respect to said carriage, means for moving said indicating scale relative to said carriage to position said indicating scale at a fixed height above the bottom of the bore at any point along such bore, and a sighting device located at one end of the bore, said sighting device being positioned parallel to the desired axis of the bore, whereby the vertical deviation of the bore from said desired axis may be observed on said indicating scale through said sighting device.

2. Apparatus for "telltaling" large horizontal bores comprising a carriage constructed to be insertable in the bore, a plurality of spherical balls rotatably mounted in the base of said carriage and supporting said carriage in said bore whereby said carriage is gravitationally self-positioning with respect to the bottom surface of the bore, means for moving said carriage thru the bore on said balls, an indicating scale vertically disposed on said carriage and a sighting device located at one end of the bore, said sighting device being positioned parellel to the desired axis of the bore, whereby the vertical deviation of the bore from said axis may be observed on said indicating scale through said sighting device.

3. Apparatus for "telltaling" large horizontal bores comprising a carriage constructed to be insertable in the bore, a plurality of spherical balls rotatably mounted in the base of said carriage and supporting said carriage in said bore whereby said carriage is gravitationally self-positioning with respect to the bottom surface of the bore, means for moving said carriage through the bore on said balls, a vertical indicating scale mounted on said carriage for vertical movement with respect to said carriage, means for moving said indicating scale relative to said carriage to position said indicating scale at a fixed height above the bottom of the bore at any point along such bore, and a sighting device located at one end of the bore, said sighting device being positioned parallel to the desired axis of the bore, whereby the vertical deviation of the bore from said axis may be observed on said indicating scale through said sighting device.

4. Apparatus for "telltaling" large horizontal bores comprising a carriage constructed to be insertable in the bore, a plunger mounted in said carriage for vertical movement with respect thereto, a vertical indicating scale secured to said plunger, resilient means biasing said plunger upwardly, a solenoid arranged in cooperative relation to said plunger to force said plunger downwardly into engagement with the bore surface upon energization of said solenoid, and a sighting device located at one end of the bore, said sighting device being positioned parallel to the desired axis of the bore, whereby the vertical deviation of the bore from said axis may be observed on said indicating scale through said sighting device.

5. Apparatus for "telltaling" large horizontal bores comprising a carriage constructed to be insertable in the bore, a plurality of spherical balls rotatably mounted in the base of said carriage and supporting said carriage in said bore whereby said carriage is gravitationally self-positioning with respect to the bottom surface of the bore, means for moving said carriage through the bore on said balls, a plunger mounted in said carriage for vertical movement with respect thereto, a vertical indicating scale secured to said plunger, resilient means biasing said plunger upwardly, a solenoid arranged in cooperative relation to said plunger to force said plunger downwardly into engagement with the bore surface upon energization of said solenoid, and a sighting device located at one end of the bore, said sighting device being positioned parallel to the desired axis of the bore, whereby the vertical deviation of the bore from said axis may be observed on said indicating scale through said sighting device.

6. Apparatus for "telltaling" large horizontal bores comprising a carriage constructed to be insertable in the bore, a plurality of spherical balls rotatably mounted in the base of said carriage and supporting said carriage in said bore whereby said carriage is gravitationally self-positioning with respect to the bottom surface of the bore, means for moving said carriage through the bore on said balls, a translucent indicating scale vertically disposed on said carriage, a source of light mounted on said carriage in cooperative relation to said translucent scale, means for moving said indicating scale relative to said carriage to position said indicating scale at a fixed height above the bottom of the bore at any point along such bore and a sighting device located at one end of the bore, said sighting device being positioned parallel to the desired axis of the bore, whereby the vertical deviation of the bore from said axis may be observed on said indicating scale through said sighting device.

7. Apparatus for "telltaling" large horizontal bores comprising a carriage constructed to be insertable in the bore, a plunger mounted in said carriage for vertical movement with respect thereto, a translucent vertical indicating scale secured to said plunger, a source of light mounted on said carriage in cooperative relation to said translucent scale secured to said plunger, resilient means biasing said plunger upwardly, a solenoid arranged in cooperative relation to said plunger to force said plunger downwardly into engagement with the bore surface upon energization of said solenoid, and a sighting device located at one end of the bore, said sighting device being positioned parallel to the desired axis of the bore, whereby the vertical deviation of the bore from said axis may be observed on said indicating scale through said sighting device.

8. Apparatus for "telltaling" large bores comprising a carriage constructed to be insertable in the bore, means for advancing said carriage through the bore in substantially the same radial position in the bore, an indicating scale mounted on said carriage for movement relative thereto in a plane transverse to the axis of the bore, means for moving said indicating scale relative to said carriage to position said scale at a fixed distance from the wall of the bore at any point along the bore, and a sighting device located at one end of the bore, said sighting device being positioned parallel to the desired axis of the bore, whereby the deviation of said bore from the said desired axis may be observed on said indicating scale through said sighting device.

9. Apparatus for "telltaling" large bores comprising a carriage constructed to be insertable in the bore, means for advancing said carriage through the bore in substantially the same radial position in the bore, a plunger mounted in said carriage for movement relative thereto in a direction transverse to the axis of the bore, an indicating scale secured to said plunger, a solenoid arranged in cooperative relation to said plunger to force said plunger radially outwardly into engagement with the bore surface upon energization of said solenoid, and a sighting device located at one end of the bore, said sighting device being positioned parallel to the desired axis of the bore, whereby the deviation of said bore from the said desired axis may be observed on said indicating scale through said sighting device.

MAURICE W. GETLER.

REFERENCES CITED

The following references are of record in the file of this patent:

UNITED STATES PATENTS

| Number | Name | Date |
| --- | --- | --- |
| 2,079,791 | Cook | May 11, 1937 |
| 2,198,837 | Morgan | Apr. 30, 1940 |